United States Patent [19]

Freund

[11] Patent Number: 5,095,421

[45] Date of Patent: Mar. 10, 1992

[54] TRANSACTION PROCESSING FACILITY WITHIN AN OPERATING SYSTEM ENVIRONMENT

[75] Inventor: Thomas J. Freund, Austin, Tex.

[73] Assignee: International Business Machines Corporation, Armonk, N.Y.

[21] Appl. No.: 395,249

[22] Filed: Aug. 17, 1989

[51] Int. Cl.$^5$ .................. G06F 11/00; G06F 15/00
[52] U.S. Cl. ..................... 395/650; 364/222.81; 364/268; 364/282.1; 364/285.2; 364/285.3; 364/943.91; 364/974; 364/976.4; 364/DIG. 1; 364/DIG. 2
[58] Field of Search ............... 364/200 MS, 900 MS; 371/12, 13

[56] References Cited

U.S. PATENT DOCUMENTS

| | | | |
|---|---|---|---|
| 4,264,782 | 4/1981 | Konheim | 364/200 X |
| 4,384,324 | 5/1983 | Kim et al. | 364/200 |
| 4,493,020 | 1/1985 | Kim et al. | 364/200 |
| 4,507,751 | 3/1985 | Gawlick et al. | 364/900 |
| 4,547,850 | 10/1985 | Genma | 364/200 |
| 4,819,159 | 4/1989 | Shipley et al. | 364/200 |
| 4,868,744 | 9/1989 | Reinsch | 364/200 X |
| 4,878,167 | 10/1989 | Kapulka | 364/200 X |
| 4,881,166 | 11/1989 | Thompson | 364/200 |

OTHER PUBLICATIONS

IBM Technical Disclosure Bulletin, vol. 24, No. 6, Nov. 1981, "Suspend Message Queue", R. S. Uyehara.
IBM Technical Disclosure Bulletin, vol. 24, No. 11B, Apr. 1982, "Recovery Protocol Using a Common Log", P. Homan, B. G. Lindsay R. L. Obermarck.
"Problems in Supporting Data Base Transactions in an Operating System Transaction Manager", M. Stonebraker.
"Multiprocessor Architecture Ensures Fault-Tolerant Transaction Processing", Mini-Micro Systems, Apr. 1983, Armond D. Inselberg.
IBM Technical Disclosure Bulletin, vol. 28, No. 10, Mar. 1986, "Integrated Concurrency and Shared Buffer Coherency Control for Multi-Systems", D. M. Dias, B. R. Iyer, J. T. Robinson, P. S. Yu.
IBM-Research Report, "Recovery Management in QuickSilver", Sep. 16, 1987, R. Haskin, Y. Malachi, W. Sawdon, G. Chan.
"OLTP on the VAXCLUSTER", DEC Professional, vol. 7, No. 1, Jan. 1988, B. Hartman IBM-Technical Disclosure Bulletin, Transaction Processing System for the IBM PC, vol. 31, No. 2, Jul. 1988, K. J. Gildea, B. Linn, J. VanBuren.
"OLTP as DEC Sees It", DEC Professional, vol. 8, No. 3, Mar. 1989, E. L. Appleton.
"Performance Considerations for an Operating System Transaction Manager", IEEE Transactions on Software Engineering, vol. 15, No. 6, Jun. 1989, A. Kumar, M. Stonebraker.

*Primary Examiner*—Robert W. Beausoliel
*Attorney, Agent, or Firm*—Mark E. McBurney

[57] ABSTRACT

A transactional support system is provided which is capable of enhancing a basic operating system so that a multitude of databases can be simultaneously processed. The transactional support system provides coordination services which designate the boundaries indicating the success or failure of an executed transaction; concurrency services provide a locking mechanism for controlling access to resources and deadlock detection in the event of the imposition mutual locks; and recovery services maintain a log which ensures that the state of the resource is preserved in the event of any failures. Further, enhanced terminal handling and transaction scheduling support the large number of terminals used in a transactional system, by utilizing methods which relieve the resource consumption associated with a large number terminals. These methods include multiple-terminal process support, transaction validation, prioritization, execution queue, action queue and availability.

41 Claims, 8 Drawing Sheets

TRANSACTION PROCESSING FACILITY WITHIN AN OPERATING SYSTEM ENVIRONMENT

BACKGROUND OF THE INVENTION

The present invention relates generally to a method and system architecture which allows a transaction processing environment to function within a distributed operating system, such as data processing, robotics, or any system which operates to perform a specific task. This invention provides transaction support services (TSS) by providing a transaction manager which supplies coordination, concurrency and recovery services to the overall operating system. Further, the system of the present invention is structured (interfaced) to provide a terminal monitor or transaction shell, such that in addition to normal terminal and screen handling facilities, the present invention will provide enhanced terminal handling and transaction scheduling functions.

It is presently known in distributed data processing systems to utilize transactional processing within single resources, such as databases, communication systems and file systems. For example, conventional database systems merely provide a user with a method for performing work on a single system, and within a single database, by supplying a mechanism to group a number of actions into a "transaction", which operates to isolate actions between system users and also provides specific guarantees regarding the effects of the operations. Further, it should be noted that operations defined within a transaction are required to either be wholly completed, or if unsuccessful, to be regarded as not occurring at all. This operating structure guarantees that the results of a successful transaction are permanent (committed) and that unsuccessful transactions are disregarded (aborted).

Prior art systems, such as a standard Unix operating system (Unix is a registered trademark of AT&T Co.) shell, provide terminal handling facilities and screen handling functions. However, conventional shells do not provide the terminal monitoring facilities necessary for optimal terminal support in the transaction environment. These facilities include enhanced terminal handling and improved transaction scheduling. Enhanced terminal handling provides loading support, whereas the improved transaction scheduling allows for: (1) transaction validation; (2) prioritization; (3) execution and action queue; and (4) availability management.

SUMMARY OF THE INVENTION

In contrast to the prior art, the present invention provides a transactional processing environment capable of enhancing an operating system so that a number of operations within a plurality of databases can be simultaneously processed. Further, a transaction environment is provided by the transaction support service (TSS) which utilizes, or exploits the operating system and additional system services, such as system resource control, file services, communications and database services. The TSS establishes the basis for a common transaction facility that can be used by all system services (i.e. resources or servers), which allow the scope of a transaction to include multiple system services. Therefore, operations in a transaction implemented by the system of the present invention are not limited to a single database and each system service is not required to provide separate implementation of transactional support, thereby decreasing the redundancy incorporated into conventional systems and increasing the efficiency of operation. The TSS provides the transaction environment by supplying coordination services, recovery services and concurrency services. Briefly, coordination services designate the boundaries of a transaction by providing the BEGIN_TRANSACTION, COMMIT_TRANSACTION AND ABORT_TRANSACTION functions. Concurrency services provide a locking mechanism for controlling access to a resource and providing for resource sharing. Additionally, the locking mechanism of the concurrency services prevents viewing changes or altering a resource on a global level until the lock is released. The concurrency services also provide a deadlock detection mechanism which insures that two waiting transactions do not waste time by waiting on locks mutually imposed by conflicting resources. Recovery services include a history file or log which maintains a record of all activity caused by the operations within a transaction. The recovery service also provides a recovery protocol which insures that the state of a resource is preserved in the event of any failure. This service uses the log information to restore the results of any successful (committed) transactions and to eliminate the effects of any unsuccessful (aborted) transactions.

The enhanced terminal handling feature of the present invention must satisfy the requirements of a large number of terminals while sustaining the heavy terminal loading factors that are associated with a transactional environment. The enhanced terminal handling facilities may use several methods to satisfy the large range of requirements for support of a plurality of terminals. These methods, such as the Getty Modification (which is a Unix operating system terminal monitor program) and Multiple-Terminal Process Support, will provide a certain degree of relief from the resource consumption that results from creating a separate process at each terminal. Transaction Scheduling provides specific services, such as validation, prioritization, execution and action queue and availability. The aforementioned enhanced terminal handling facility and transaction scheduling of the present invention allow a number of terminals to be used while still guaranteeing the response criteria expected in a transactional environment. Also, the transactional environment is responsive to the dynamic changes in workload typical of this type of environment, while requiring no external intervention in the event of a transaction failure. The present invention is capable of obtaining this high degree of responsiveness due to the use of high availability environments (i.e. switching between systems having redundant processors, replicated processes, or the like). It should be noted that the foregoing examples are included for illustration purposes only and are not an indication that the specifically named high availability environments are the only ones contemplated by the present invention.

DETAILED DESCRIPTION OF THE PREFERRED EMBODIMENT

Figure 1:
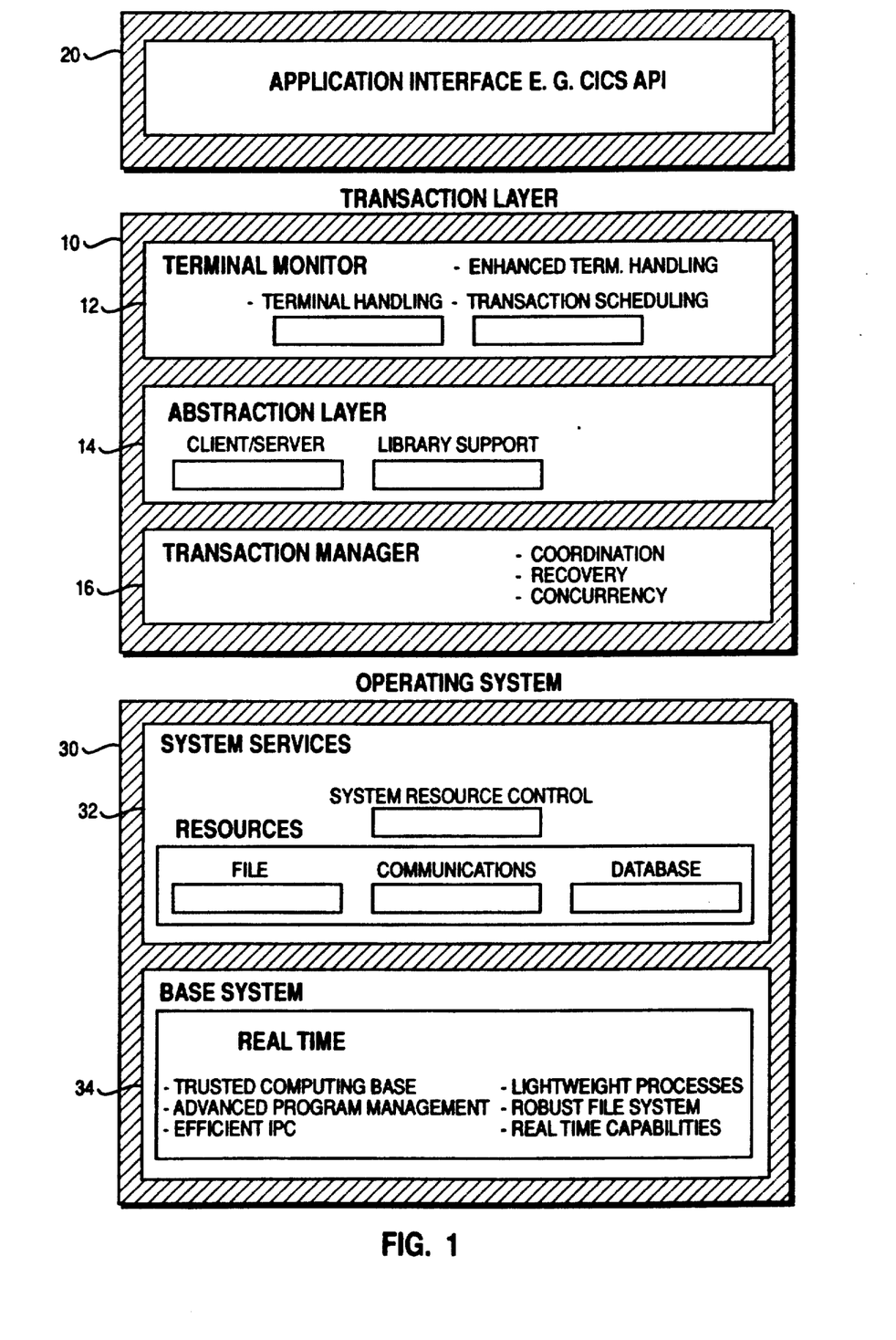
FIG. 1 is a block diagram showing a transaction services system of the present invention including a transaction layer which has a terminal monitor and transaction manager.

Referring to FIG. 1, the overall transaction services system of the present invention is shown and includes a transaction layer 10 which operates in conjunction with an application interface 20, such as a CICS application program interface, or the like and an AIX (AIX is a trademark of IBM, Corp.) or similar type operating system 30 which includes extensions such as a system resource controller (SRC) 32 and real time base system 34. The transaction layer 10 includes a terminal monitor 12, abstraction layer 14, (which provides distributed services, such as library support and the client/server relationship) and transaction manager 16. These systems all interact to provide the transaction processing environment of the present invention.

Figure 2:
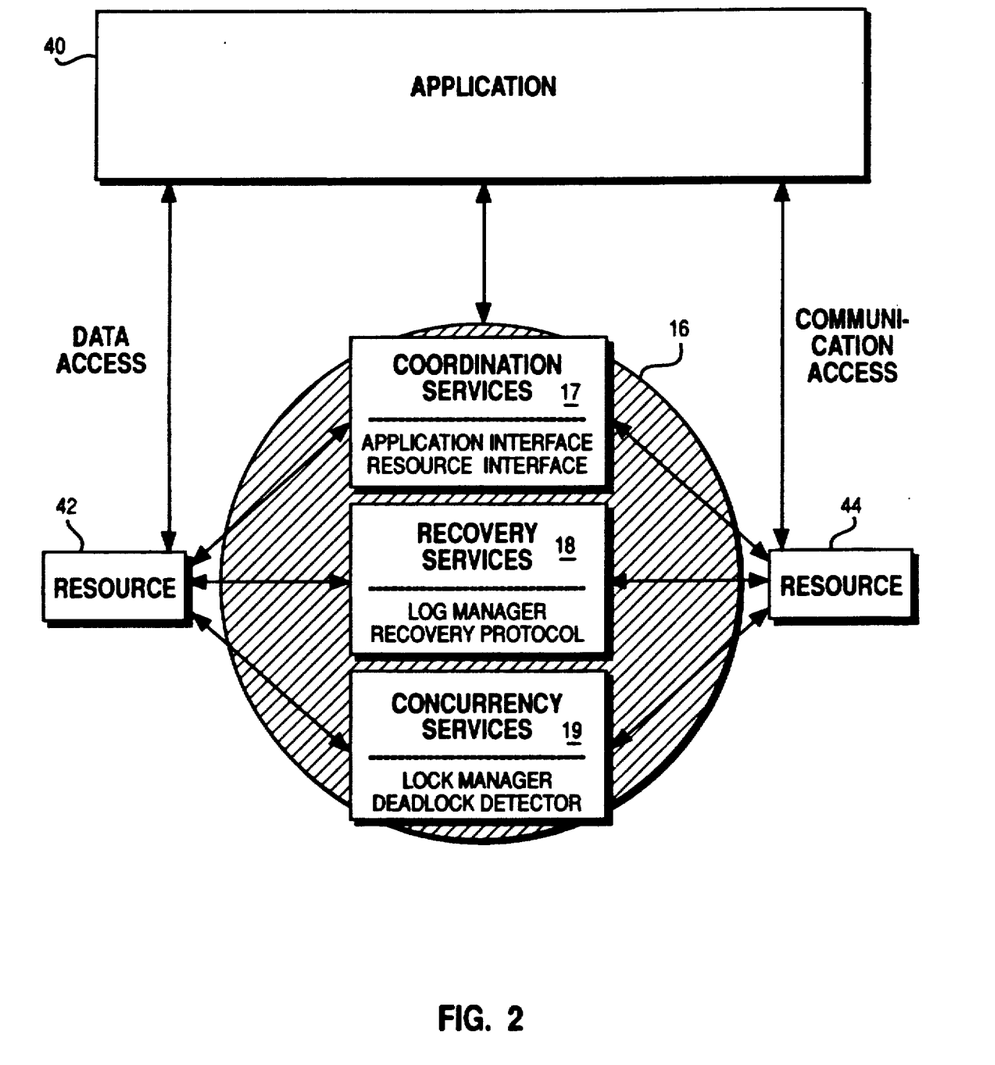
FIG. 2 depicts the transaction manager and its relationship to the program application and resources, as well as showing the transaction services provided by the transaction manager.

The relationship between a program application 40 and transaction manager 16 is shown in FIG. 2. Also, the data access interface and communication access interface are shown accessing resources 42, 44, respectively. It should be noted that a plurality of different resources, such as OSI, SNA, Files and Databases can be used. Further, FIG. 2 shows the interfaces between transaction manager (TM) 16 and resources 42, 44. These TM - Resource interfaces are discussed in detail with reference to FIGS. 5 through 7 below and provide the transaction processing services.

FIG. 2 also shows the components of the transaction manager 16 including coordination services 17, recovery services 18, and concurrency services 19. Coordination services define two external interfaces, i.e., the interface between the transaction manager and the program application 40, and the transaction manager and the resources. Recovery services 18 define a log management system which includes a recovery protocol while concurrency services 19 define a lock management service and deadlock detection service.

Figure 4:
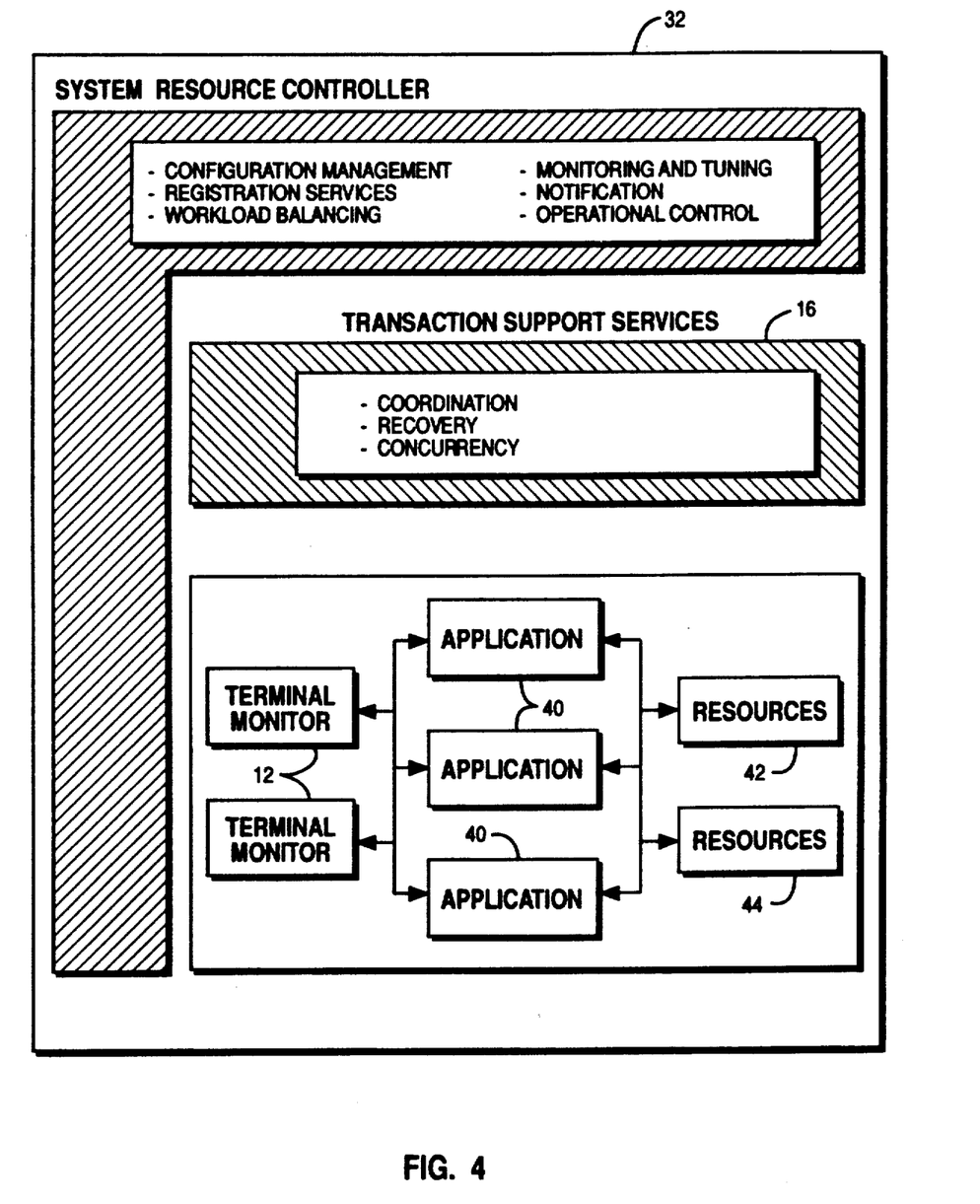
FIG. 4 is another block diagram depicting the system resource controller and its relationship to the transaction manager and transaction shell.
Figure 4A:
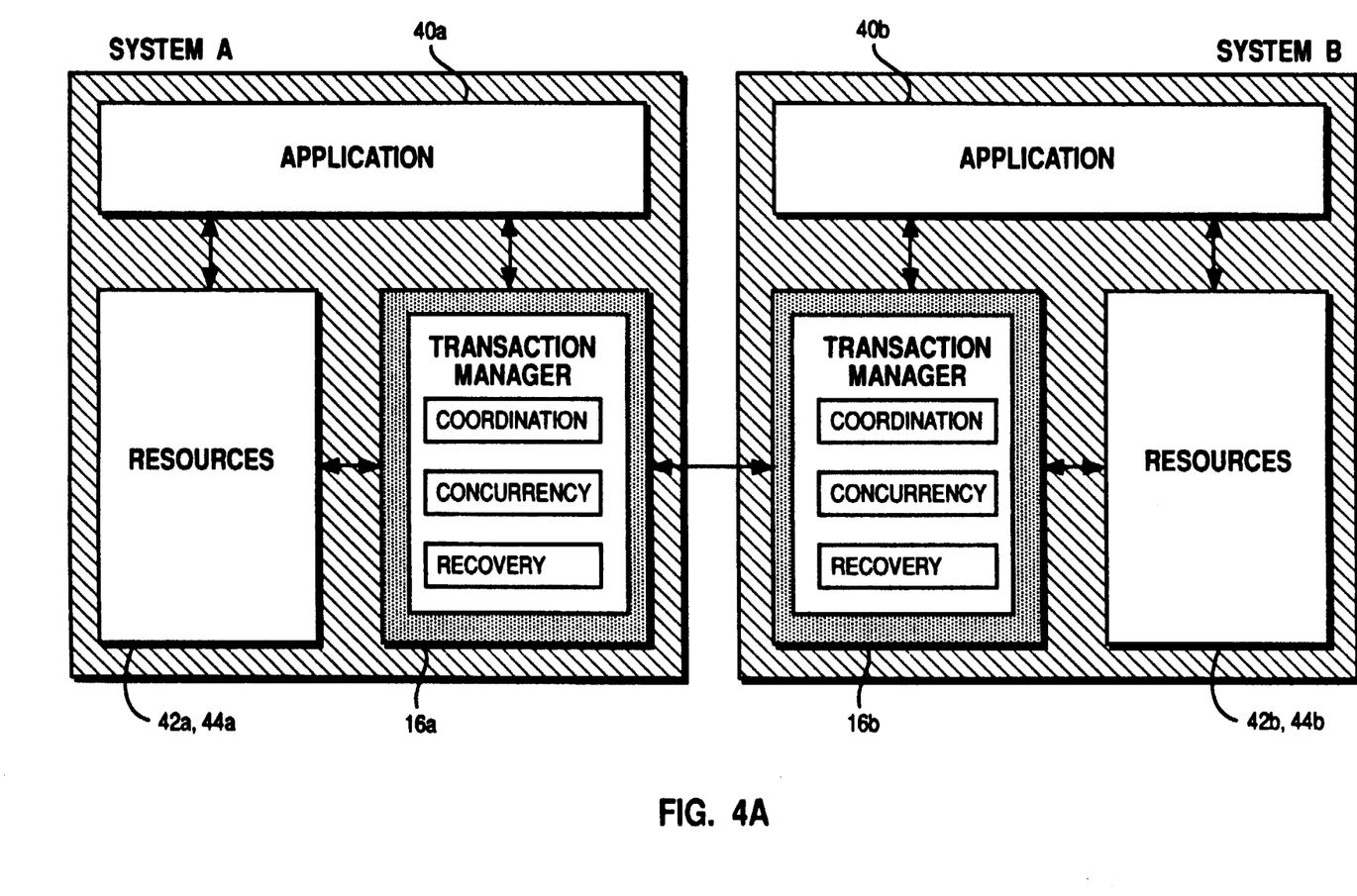
FIG. 4a is a block diagram illustrating connections across multiple systems, each including a transaction manager and local resources.

Referring to FIG. 4a, it can be seen how multiple systems can be interconnected such that access to remote resources is provided to different program applications 40. Requests for remote resources, such as application 40a requesting resources 42b,44b, cause the communication between transaction managers 16a and 16b to be established. For example, local transaction manager 16a records the destination of the request for remote resources 42b,44b from application 40a and transfers the transaction responsibility for the request to the remote transaction manager 16b.

Figure 5:
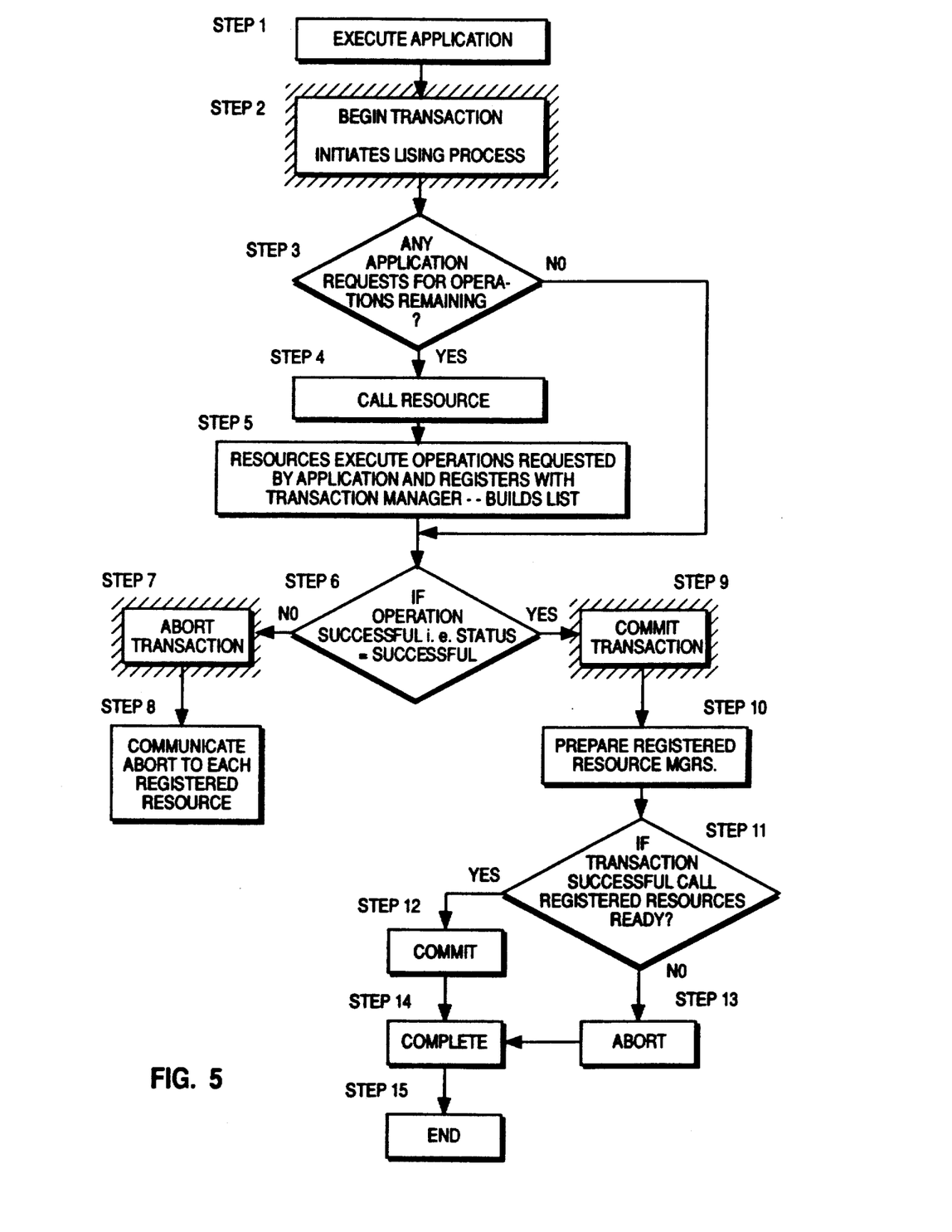
FIG. 5 is a flow chart which represents the processes used by the transaction manager to provide coordinating services to the operating system.

The coordination service 17 will now be described in conjunction with FIG. 5, which shows the processes undertaken by the transaction manager which are required to coordinate the interfaces between application 40 and resources 42, 44. The program application 40 defines the boundaries within which the transaction manager operates. That is, application 40 issues commands to the transaction manager which govern the operation of the particular transaction. It should be noted that a transaction is defined as a group of individual operations which may occur across a number of resources. Thus, the transaction manager isolates the operations implemented by these resources and provides specific guarantees regarding the effects of these operations. These operations occur within resources 42,44 and at the direction of the program application. Therefore, it can be seen how coordination services are required to synchronize the resources under the control of the program application 40, and how the transaction manager removes the responsibility of coordinating operations within a transaction from application 40.

The boundaries utilized by the transaction services of the present invention are BEGIN_TRANSACTION which starts the process, COMMIT_TRANSACTION which directs that actions which have been successfully completed are physically applied to the resources involved, and ABORT_TRANSACTION which directs that unsuccessful actions within a transaction are discarded.

The actual steps required to provide the coordination services will now be described with reference to FIG. 5 where at step 1 the transaction services are initiated by program application 40 which issues transaction coordination commands to the transaction manager 16. At this point, it should be noted that an execution environment is defined within the operating system 30 and a standard group of resources may be utilized each time the application calls for a specific program, thereby establishing the resources in the transaction environment. However, if the resources to be used in the executed program application are not identified then, at step 2, TM 16 begins a process which will log all of the participating resources 42, 44. Step 3 determines whether there are any remaining operations, requested by the program application, which need to be performed. If there are no remaining requests, then steps 4 and 5 are bypassed and the program proceeds directly to step 6, where it is determined if the operations have been successful. However, if it is determined at step 3 that there are remaining operations, requested by the application, which must be performed, then at step 4 the application calls each resource to be used in the particular transaction by sending a message having the transaction identifier appended thereto. Subsequently, each contacted resource informs the transaction manager that they are participating in the transaction. Each participating resource is then recorded on the log, maintained by the transaction manager, and is designated as corresponding to a particular transaction. The system proceeds to step 5 where the resources perform, or execute the operations required by the particular transaction and registers with the transaction manager. At this point, the recovery services of the present invention (described below) lists the results of these operations such that these results correspond to the registered resource performing the operation. Thus, the transaction manager is able to build a listing of registered resources and the results of their particular operations. The program then exits (ends its task) the resource and proceeds to step 6. If any of the operations were determined to be unsuccessful at step 6, then step 7 aborts the transaction (i.e., if any operation within the transaction is unsuccessful then the transaction manager treats the transaction as having never occurred) and this abort message is communicated to each resource which is registered with the transaction manager.

However, if at step 6 the operation was determined to be successful, then the system proceeds to step 9 which allows the transaction to be committed if all of the requested operations were successful. At step 9 the application has concluded that a transaction should be globally committed and the responsibility for synchronizing the commit operation between all participating resources shifts to the transaction manager. Step 10 begins performance of a two-phase commit, where at phase 1 the transaction manager sends a prepare message to all participating resources (i.e., those which are on the transaction managers log) and if the decision at step 6 was to commit then the resources log a ready message and send it back to the transaction manager. However, if the decision was to abort, then the abort message is logged and sent to the transaction manager which collects all of the ready and abort messages from the various resources. The previous steps constitute phase 1 of the two-phase commit operation. Phase 2 includes, at step 11, determining if all of the registered resources are "ready," i.e., step 11 separates the abort and ready messages. If at least one abort message is present, then at step 13, the transaction manager logs the abort message and sends the abort message(s) to all of the resources which previously sent the ready messages. However, if all messages received by the transaction manager are "ready" then at step 12 the commit is logged in at the transaction manager and a commit message is sent to all of the resources. After receiving the commit/abort message all of the "ready" resources log the commit-/abort message and send an acknowledgement to the transaction manager. At this point, the program application is also notified that the transaction has actually been committed/aborted (i.e. all participating resources have sent "ready" messages). The transaction manager then collects all of the acknowledgements, logs complete (at step 14) for the committed or aborted transaction record and proceeds to step 15 which ends the process. Thus, it can readily be seen how a two-phase protocol is used to commit the transaction.

It should be noted that other types of commit protocols may be utilized by the transaction system of the present invention. For example, a heuristic commit protocol may be used which eliminates any block time that may exist during the period, which begins when a resource responds "ready" to the transaction manager, up until the commit, or abort message is received therefrom. This blocked state holds the resources associated with the transaction in check, or under a waiting mode. The heuristic protocol makes a predetermined decision as to the outcome (commit or abort), thereby freeing these resources. When communication between the resource and transaction manager is re-established then the transaction manager is informed that a heuristic (predetermined) decision has taken place. The program application then learns of this heuristic decision on return from the COMMIT_TRANSACTION call. An external method is then required to resynchronize all of the resources to a common level. Thus, the system of the present invention allows a commit protocol to be extended to include a two-phase commit having a heuristic reply.

The transaction system of the present invention also allows other types of transactions to take place, such as implicit, local, distributed, nested and concurrent transactions.

Implicit transactions specify the action performed by the application which are to be treated as recoverable. Local transactions occur where an application delegates a plurality of actions to multiple resources, which are all located at one site. However, distributed transaction processing supports access to remote resources, i.e., an application performed by a number of actions to multiple resources which are all spread across several sites. Nested transactions allow a transaction (child) to be nested within another currently active transaction (parent). Any transaction updates made by the child are not made permanent unless the parent transaction commits, thus the child transaction may fail independently of the parent without triggering an abort in the parent transaction. If an application program structure allows division of the program, then a concurrent transaction will divide the work into separate logical pieces (transactions) which may succeed or fail independently of each other.

Figure 6:
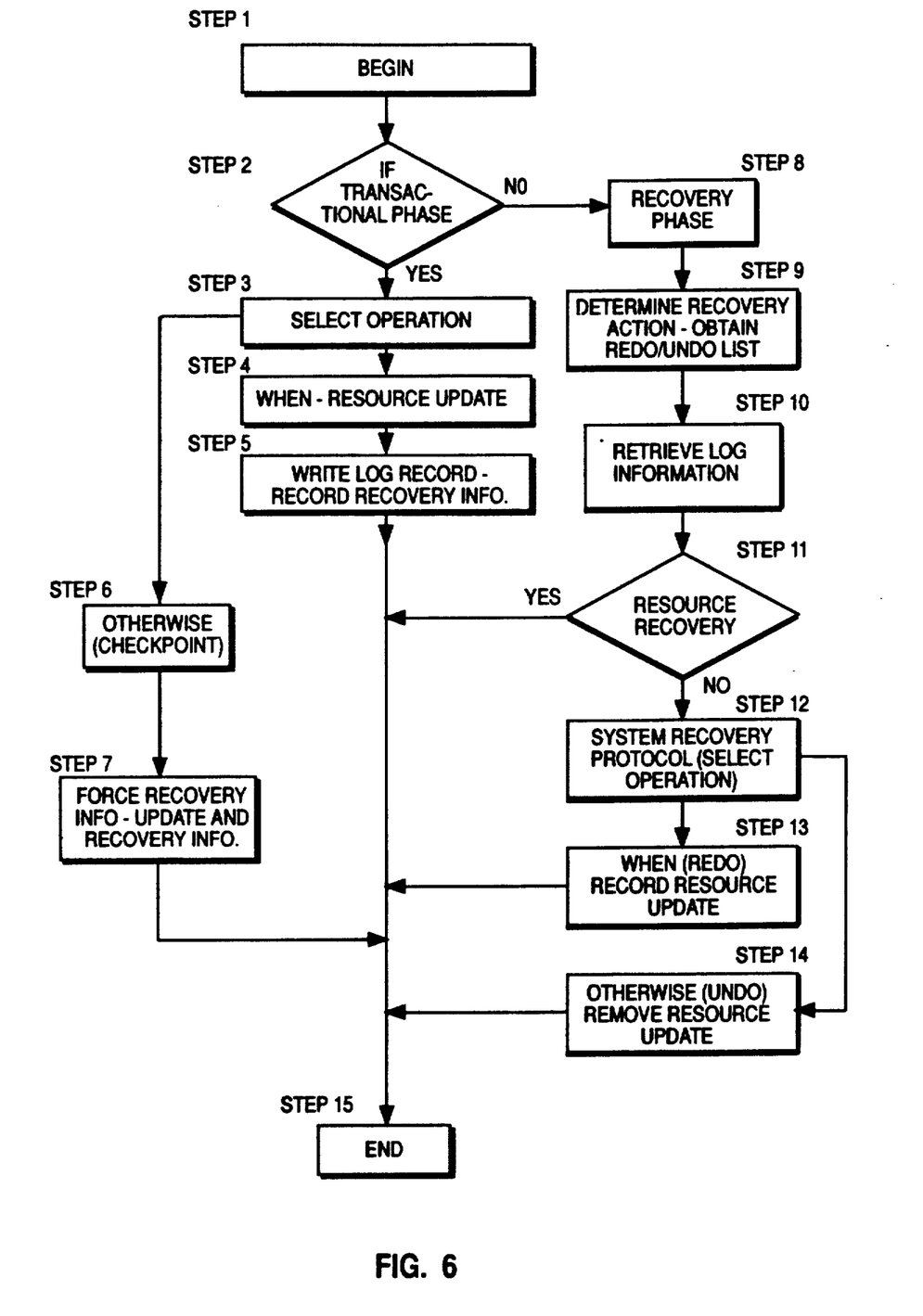
FIG. 6 is a flow chart representing the processes involved in providing recovery services.

The recovery services provided by the transaction support system of the present invention will now be described with reference to FIG. 6. The recovery services include log manager interface and recovery protocol services. The log manager interface is required so that general logging facilities are provided from which the higher level recovery protocol can be constructed. The recovery protocol requires the following specific criteria be met. Transactional information (BEGIN, COMMIT or ABORT) which reflects the current state of the transaction must be recorded. Further, operational information which reflects the actions required to redo and undo the operation performed in a transaction. Additionally, the information indicating that an undo operation must be performed has to be guaranteed on stable storage prior to permanently modifying a resource. Similarly, the redo information must be guaranteed on stable storage before committing a transaction.

The log manager interface of the present invention meets the aforementioned criteria by providing a recovery log on which specific information can be recorded and which defines user actions that may describe compensation operations, value records or other similar type operations. Particularly, the following record information is pertinent: (1) resource identification; (2) transaction identification; and (3) the log record identification (which may include the aforementioned compensation, operation value information, or the like). The log management services provided include: (1) read-/write/force log record; (2) resource query for transactions requiring recovery; (3) log replay by log scan; and (4) log information obtained and organized by resource, or transaction.

Once the above noted log management interface is established, the recovery protocol can be established which uses the results of the logged information to restore the results of the committed transactions and to undo the effects of aborted, or incomplete transaction.

A system recovery protocol mechanism determines the transactions (if any) which need to be undone by replaying the log information for transactions that are incomplete or aborted (incomplete transactions have a record of BEGIN_TRANSACTION but do not include an ABORT_TRANSACTION or COMMIT_TRANSACTION; aborted transactions have a record of BEGIN_TRANSACTION and ABORT_TRANSACTION). Also, the transactions that need to be redone are determined by replaying the log information for complete transactions (complete transactions have a record of BEGIN_TRANSACTION and COMMIT_TRANSACTION). A recovery checkpoint is utilized to minimize the amount of time required for recovery. By providing this checkpointing operation all changes are placed (forced) into stable storage at specified intervals, therefore it is only necessary to replay the log information to the last checkpoint.

The recovery system of the present invention simplifies implementation of the aforementioned recovery protocol by providing basic recovery primitives which include: (1) recovery analysis; (2) recovery processing assistance; and (3) recovery checkpointing. Additionally, the recovery services of the present invention satisfies the requirements of any write-ahead logging protocol by guaranteeing that all undo information will be placed in stable storage before any permanent modification of a resource is implemented and that all redo information is guaranteed on stable storage prior to committing a transaction. It should be noted that the present invention does not preclude a resource from using the recovery primitives and implementing a private recovery protocol, rather than the overall system recovery protocol (i.e. the recovery primitives may be used with or without the system recovery protocol).

Referring to the recovery primitives, recovery analysis operates to construct a list of transactions which must be undone, or redone. Data retrieval is enhanced by the recovery processing assistance function, which provides log scan operations that retrieve information associated with a particular server, or transaction. As stated above, checkpointing minimizes recovery processing time by forcing any changes to stable storage. The above discussed recovery service will now be described with reference to FIG. 6. The process begins at step 1 and continues to step 2 where it is determined whether the process is in the transactional phase or recovery phase. If the system is in the transactional phase, then step 3 selects the operation to be implemented. That is, whether to proceed to step 4 and update the resource log or skip to step 6, which is a checkpoint. When the resource update is selected, the recovery service process then writes the log record (step 5), thereby recording the recovery information prior to continuing on to the program end (step 15). Otherwise, the checkpoint function (step 6) is implemented and step 7 forces the recovery information into stable storage, effectively updating this information. After step 7, the system proceeds to the program end.

However, if at step 2 it was determined that the process was in the recovery phase (step 8) then the recovery action to be taken is determined, i.e., the undo and/or redo lists are obtained from the resources. Step 10 retrieves log information recovered in step 9 and at step 11 the type of recovery service desired to perform the specific resource recovery is determined. If, at step 11, resource recovery is selected, then upon completion of the recovery of information by the resource, the recovery operation ends (proceeds to step 15). However, if the program proceeds to step 12, then the system recovery protocol has been selected and step 12 selects whether to redo and record the resource update information (step 13) or undo and remove the resource update information (step 14). Subsequent to the implementation of either steps 13 or 14, the system proceeds to step 15 and the program ends.

Another of the services provided by the transaction support services system of the present invention is concurrency services, which include a lock manager and deadlock detector. The lock manager provides a mechanism (locking) which controls access to a specific resource. Locking prevents other users from viewing changes or altering a resource until the lock is released. The basic locking mechanism provides the commands lock and unlock. The lock command looks at the lock name (name of resource or object being locked) and lock mode (type of lock placed on resource, i.e., shared or exclusive).

More particularly, lock modes (basic locking primitives) correspond to the nature of the locking operations to be performed on the items. For example, shared mode is specified on an item that is to be read and an exclusive mode is placed on an item that is to be updated. The rules governing the lock manager function state that a transaction can view an item if it is not being altered, and a transaction can alter an item if it is not being viewed. Thus, it can be seen that shared mode is specified on a transaction being viewed, but not altered, whereas exclusive mode is specified on a transaction being altered, but not viewed. The granularity of a lock relates to the size of the object being locked, e.g., coarse granularity corresponds to a file level and fine granularity corresponds to a record level. Generally, the finer the granularity the greater degree of concurrency achieved, since transactions have a smaller likelihood of lock conflict.

Further, the recovery system of the present invention includes additional logical locking primitives, or commands which provide extended locks, intention locks and distributed locks. Extended locks provide an extended lock mechanism, but caution should be exercised prior to their use as the transactional characteristics described above can be affected. That is, by implementing the extended lock primitives, the responsibility for supervising resource locking is taken from the lock manager. Thus, more control over the locked resources is gained, but more caution must be exercised to insure that access to locked resources is not obtained by users other than the origination lock owner. The commands used to implement the extended lock service are TEST (looks at lock name, lock mode) and PROMOTE (extend locking) and DEMOTE (degrade lock). Both the PROMOTE and DEMOTE commands look at lock name. Intention locks allow certain database implementations to be locked such that hierarchies are established and contextual relationships between resources exist. A protocol is defined which satisfies the locking requirements of a hierarchy by providing an additional lock mode that allows implicit locking. To support the rates associated with high volume transaction processing environment, data sharing and data replication need to be supported. To meet these requirements, distributed locks allow a more sophisticated two-phase locking system to be utilized such as primary copy locking, majority locking, WRITE_LOCKS_ALL and READ_LOCK_ONE. It should be noted that numerous other locks can be utilized by the lock manager and the foregoing are included as illustrative only.

Another aspect of concurrency services is deadlock detection, which is required when two-phase locking techniques are used since situations occur in which lock conflicts arise between transactions and deadlock results. For example, consider the sequence when transactions 1 and 2 begin simultaneously, each an exclusive lock on the other. In this instance, both transactions will wait forever for the locks to be released, thus requiring that a method such as timeout, deadlock-prevention or deadlock-detection be utilized to discover the deadlock situation. Once the deadlock is detected one of the transactions is ended in order to release the locks and allow work to continue, thus ending the deadlock condition. The choice of which transaction to abort is based upon a number of selection criteria, such as ending the transaction which causes the minimal amount of work to be lost, establishing a predetermined priority basis for transaction execution or transaction termination, or the like.

The lock manager of the present invention uses a deadlock detection system which may provide methods, such as a timeout method and deadlock detection method. The timeout method specifies a predetermined period as the wait interval for a transaction. It should be noted that this method (timeout) may be initiated by situations other than strictly deadlock conditions, such as system loading, overheads and delays in a distributed environment. Generally, a timeout method is appropriate for a lightly loaded system, but inappropriate for a congested system. The duration of the timeout interval should be capable of being varied.

In the deadlock detection method, a graph representing the relationship between transactions and lock requests is analyzed to determine if a lock conflict exists. If a deadlock does exist the graph will indicate the existence of a lock cycle. For example, transaction 1 has a lock on transaction 2 which in turn has a lock on transaction 1 (i.e., $T_1 - T_2 - T_1$).

Figure 7:
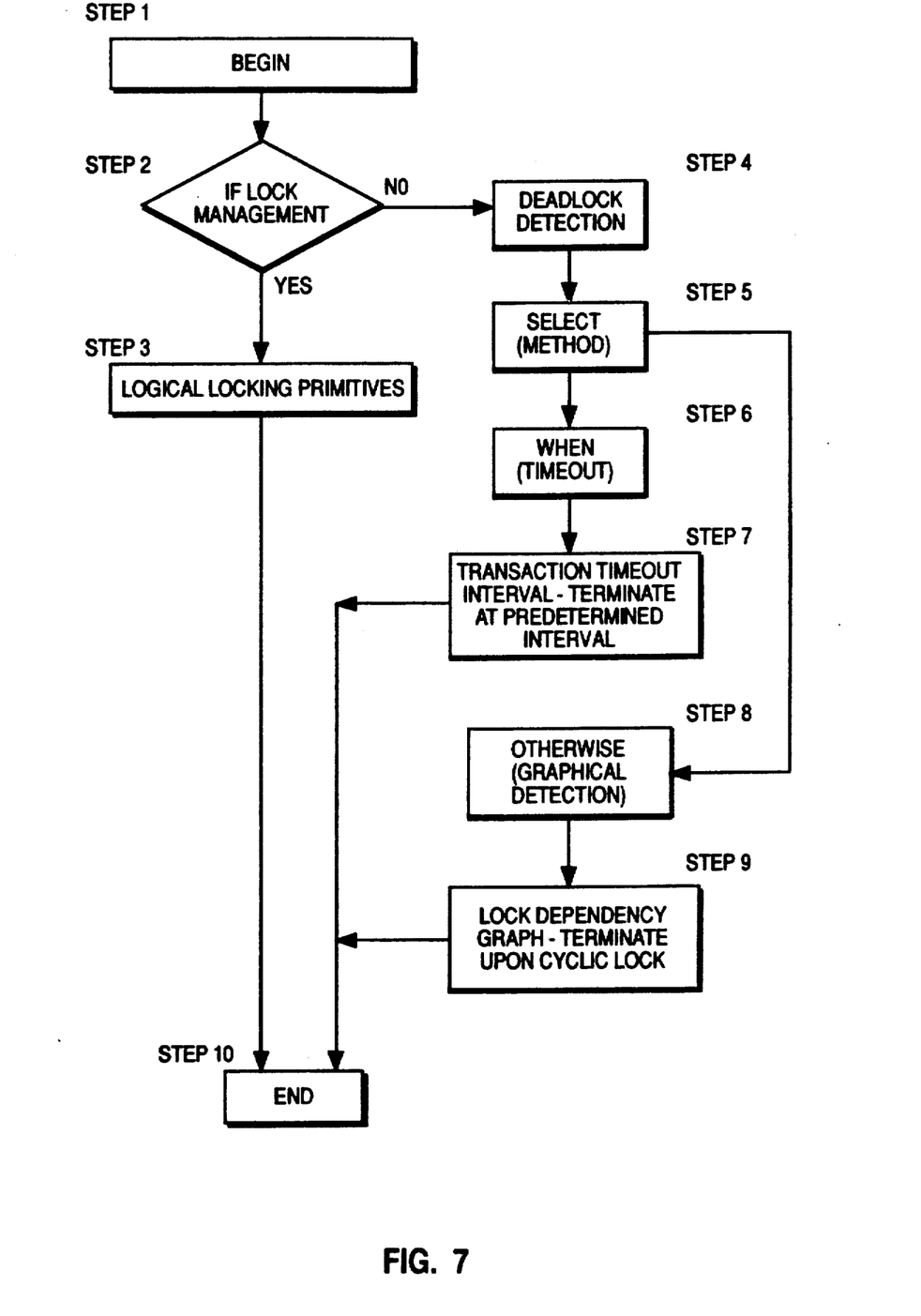
FIG. 7 is a flow chart showing the method by which the transaction manager provides concurrency services.

The concurrency services utilized by the transactional services of the present invention will now be described with reference to FIG. 7, which indicates at step 1 the beginning of the process. Step 2 determines whether the system is utilizing the lock manager, or deadlock detection mechanisms. If the lock manager is implemented, then the system proceeds to step 3 where the aforementioned logical locking primitives (such as lock commands, extended locks, intention locks, distributed locks) are implemented and the process then continues to step 10 and ends. However, if at step 2 the system determines that the deadlock detection mechanism is to be used, then the concurrency service process proceeds to step 5 and selects the method of deadlock detection to be used (i.e., timeout or graphical deadlock-detection, the selection depending on the magnitude of system loading). If timeout (step 6) is selected then the program proceeds to step 7 where the predetermined time period is specified and the system waits until the time period has elapsed. The system then proceeds to step 10 and ends. If, at step 6, timeout is not selected, then the system proceeds to step 8 where graphical detection is implemented. Step 9 then looks at the lock dependency graph and determines if any cycle locks are present, prior to ending the concurrency services at step 10.

Figure 3:
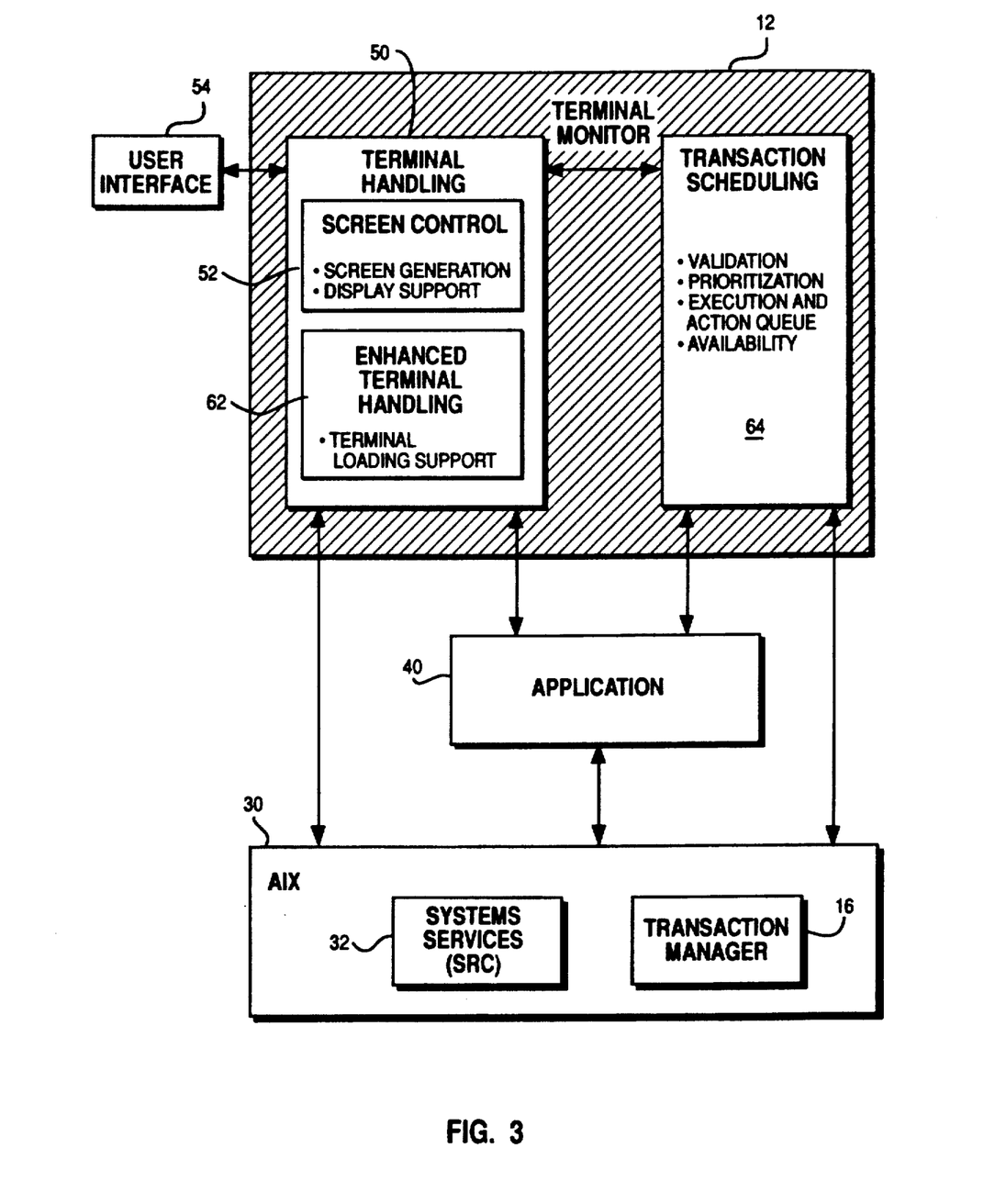
FIG. 3 is a block diagram depicting the enhanced terminal handling and transaction scheduling capabilities of the present invention.

The enhanced terminal handling and transaction scheduling features of the present invention will now be described with reference to FIGS. 3 and 4. The enhanced terminal handling shell 50 of the present invention includes a conventional terminal handling shell 52, such as a standard Unix system shell and an enhanced terminal handling system 62. It should be noted that terminal handling shell 50 is in communication with user interface 54, as shown in FIG. 3.

Generally, a shell is defined as a program which interprets commands entered by the system user (interface 54). A transaction shell allows isolation of terminal service activity outside the application process. More specifically, with regard to the present invention, terminal monitor 12 includes enhanced terminal handling shell 50, as well as a transaction scheduling system 64. The standard terminal handling shell 52 provides the screen control features of display support and screen generation. Whereas the enhanced terminal handling system 62 provides the feature of terminal loading support. Terminal monitor 12 of the present invention provides the capability to shield the terminal user from process failures by assuming responsibility for reissuance of terminal requests. Transaction services require that a large number of terminals be involved, thus the need for enhanced terminal loading to support these terminals and satisfy this requirement can be seen.

In order to meet the aforementioned criteria, several methods may be employed which will provide a sufficient number of processes to support the heavy terminal loading and large number of terminals. For example, a moderate number of terminals and their associated loading can be supported by using an enhanced version of the Getty Modification. This process modifies the UNIX operating system terminal monitor program known as Getty, such that a number of terminals, rather than a single terminal are serviced, thereby reducing the process resource required to handle the terminal initiating operation, or login. Additionally, multiple terminal process support can be utilized by the enhanced terminal system of the present invention. Multiple terminal processing support exploits the base operating system, shown as 30 in FIG. 3, such as AIX kernel facilities or the like, to service a number of terminals simultaneously within a single process, thereby avoiding the resource consumption that results from creating a separate process for each terminal. It should be noted that the use of other methods is contemplated by the present invention and the previously mentioned methods are included merely as illustrative of the type suitable for use with the present invention.

The enhanced terminal handling feature of the present invention prevents allocation of a process to support each terminal and reduces the amount of dedicated resource for each terminal, as well as reducing processing overhead required to switch between terminals. Further, the transaction shell having enhanced capabilities allow support of large terminal networks by supporting each terminal through the use of a dispatching algorithm or implementation which allows multiple terminal contexts within a single process. An additional capability provided herein allows terminals with performance critical requirements to be attached to a dedicated terminal monitor 12 (e.g., see FIG. 4), or a terminal monitor 12 can be provided to serve a limited number of terminals, or configured such that priority control mechanisms within the transaction scheduling system 64 provide specific performance characteristics.

The enhanced terminal handling capability additionally allows function encapsulation by breaking down a request for processing into terminal management and application capability. Terminal management allows the pause associated with the user dialog at one terminal to be utilized to service a number of other terminals.

Whereas, the application feature allows continuous servicing of terminal requests.

The transaction support service of the present invention, and in particular terminal monitor 12, also includes transaction scheduling system 64 which provides specific services, such as validation, prioritization, execution and action queue and availability.

The validation function interprets user requests, thus insuring that the request specifies a valid transactional application and restricts the use of non-transactional functions. Further, the validation function verifies and insures that a specific user has the appropriate privileges to access particular transactional applications. Validation also includes specifying the execution environment to the system resource controller (SRC), shown in FIGS. 3 and 4. That is, validation for either a standard process invocation for an application, a performance critical application or a fault tolerant application can be specified to the system resource controller (SRC).

Conventional commands provide a facility which allows execution priority to be specified for a particular process. However, the prioritization function of the present invention extends the above-noted facility to provide monitoring (priority inquiry operations) and tuning (continuous reassignment of execution priorities). Thus, monitoring and tuning allows performance optimization to match the execution environment in response to changes in processing demands.

The execution queu and action queue functions of the transaction scheduling system of the present invention provide retention of recorded transaction requests and output operations in the event of a transactional failure. In contrast to the present invention, conventional transaction processing systems have not fully addressed the inclusion of external operations as part of the process. The transaction usually includes input (message request to execute a transaction), execution (transactional processing) and output (actions/messages resulting from processing). Generally, unless explicitly recorded, requests to perform transactions are lost if the executing transaction aborts. The present invention maintains a recoverable input queue to insure all requests are retained, should a transaction abort. Further, the terminal monitor isolates the user from details associated with reissuance of a request. This recoverability has been extended to include transactional output operations. It is desirable to include output operations as actions under transaction operation structure, i.e., either all actions in a transaction are successfully performed (commit) or none are performed (abort). The present invention, by utilizing the action queue allows output operations performed during the transaction execution to be compensated in the event of a failed transaction. Also, the output operations scheduled after a transaction execution are guaranteed. Conventional systems, such as a UNIX operating system provide commands which allow a facility to recall a series of input requests. The present invention extends this facility to a transaction processing environment where transactional input requests are automatically reinvocated based on defined criteria. A series of output requests are maintained such that recovery of these output operations is guaranteed and output operations are restorable (i.e., output operations are compensated for failed transactions).

The availability function of the transaction scheduling feature of the present invention implements a methodology which allows the transaction shell to create a fault tolerant environment by synchronizing and switching between primary and backup processes.

A process pair method can be utilized in which the fault tolerant environment is based on an indication in the application profile that triggers the creation of a process pair for execution in the application. A process pair includes two separate application processes, each residing in different processors. The primary process actively executes the application while the remaining process (backup) remains inactive. The backup process functions to continue the processing in the event of a failure by the primary process. Primary and backup processes remain synchronized by preserving pertinent application state information in non-volatile storage.

Should a process fail the system resource controller notifies the transaction shell of the failure and the execution of terminal requests are reassigned to the backup process. Therefore, it can be seen how the fault tolerant environment is created by utilizing two processes each capable of executing the specific terminal requests.

Another method which will allow a fault tolerant environment is to create the backup process only after detection of a failure in the primary application process. The SRC can load the backup application process into an operational processor and rely on the backup process to recreate the execution environment at the point of failure, the re-creation being possible due to the fact that pertinent application state information is maintained on non-volatile storage. This created backup method relieves the transaction shell from the need for maintaining any synchronization and switching responsibility. Again, the aforementioned methods are merely illustrative and are not intended to exclude other contemplated methods from the scope of the present invention.

Next, the aforementioned system resource controller (SRC) and its relationship to the transactional support services (TSS) will be described in detail with reference to FIG. 4. The SRC of the present invention utilizes information maintained in tables to manage the relationship between users, programs and data. These features allow programmers to concentrate on the requirements of an application. The operational environment created by the above features is flexible and can be altered to reflect changes in the system. Further the present invention optimizes performance in response to changes in processing demands. The SRC is integral to transaction processing because the aforementioned operational environment is provided, as well as a mechanism which loads the transaction shell.

The SRC provides the configuration management facility which maintains the information to describe a specific resource. It can be seen from FIG. 4 that at least one terminal monitor 12, applications 40 and resources 40,42, such as data communications, database, or the like are included. For example, information such as the resource definition which includes the properties of the resource, the operation environment and the relationships within the operation environment are maintained. Also, resource control information is maintained such that start, manage, and other specific functions can be supervised.

Registration services provide the SRC with the capability of registering and maintaining global resource information. The SRC registration services allow a requestor to determine the location of a desired service. Location transparency is then provided by isolating a requestor from the knowledge of the location of the resource.

The SRC of the present invention also includes a workload balancing feature which provides a mechanism to insure that the work is proportionately spread across the system. This task is accomplished by load balancing (assuring the workload is "assigned" equally among nodes) and load sharing (assuring that workload is executed equally among all the nodes).

Notification services of the SRC provide a mechanism which tracks the state of a resource. Interested parties, which are defined by the relationship information in the configuration management facility, are informed of any state change of a resource.

System performance optimization and the execution environment are matched by the SRC monitoring and tuning facilities, in response to the changes in processing demands. Resources defined to the configuration management facility can be interfaced to the operational control facility of the SRC Operational control facilities provide the functions of start, stop, suspend, resume, query, and the like.

The aforementioned facilities of the SRC provide significant advantages over conventional resource controllers which do not allow an operational environment to be externally controllable and are unresponsive to the changes in workload which are typical of transaction environments. Further, conventional controllers require more extensive programming to locate a required service than the present invention, thus making registration and location of services an extremely cumbersome procedure.

Although certain preferred embodiments have been shown and described it should be understood that any changes and modification may be made therein without departing from the scope of the appended claims.

What is claimed is:

1. A transaction manager which provides a transactional environment wherein a group of operations, being executed by data resources, are organized as a transaction, said transaction manage comprising:
    means for providing direct access of data between said transaction manager and said data resources;
    means for supervising at least one of said data resources;
    operation outcome means for determining a result of said operations by determining whether said operations are successful or unsuccessful; and
    transaction outcome means for determining a result of said transaction by determining whether said transaction is successful or unsuccessful, and operating to abort any transaction including an unsuccessful operation and committing data to a transaction requestor for all transactions including only successful operations.

2. A system according to claim 1 wherein said means for supervising comprises coordination means for communicating with said data resources participating in a specific said transaction, and for maintaining a log which lists said participating data resources and the results of said operations performed by said participating data resources.

3. A system according to claim 1 wherein said means for supervising further comprises concurrency means for controlling access to said data resources by excluding access to said data resources and detecting any condition, imposed by at least two of said data resources upon one another, where access to said data resources is mutually excluded.

4. A system according to claim 1 wherein said means for supervising further comprises means for recovering the results of all of said transactions, if a system failure occurs, by undoing all of said unsuccessful transactions, and redoing all of said successful transactions.

5. A terminal monitoring system which provides terminal support in a transactional environment where a plurality of terminals are present, said terminal monitoring system comprising:
    terminal loading support means for implementing one of a plurality of methods to support said plurality of terminals; and
    transaction scheduling means for providing specific services which allow said plurality of terminals to implement a plurality of transactions, said services including at least one function to coordinate said plurality of terminals.

6. A system according to claim 5 wherein said terminal loading support means comprises:
    means for reducing resources required to service terminal initiation operations for said plurality of terminals; and
    means for monitoring all of said plurality of terminals.

7. A system according to claim 5 wherein said terminal loading support means comprises means for simultaneously servicing said plurality of terminals within a single process by utilizing an associated base operating system.

8. A system according the claim 7 wherein said simultaneous servicing means comprises means for utilizing a pause associated with user dialog at a first terminal to service remaining ones of said plurality of terminals.

9. A system according to claim 5 wherein said transaction scheduling means comprises:
    means for validating requests by users of said plurality of terminals, and for verifying any privileges of use afforded said users within said transactional environment;
    means for prioritizing execution of one of said plurality of transactions based upon predetermined criteria;
    means for recovering said requests from said users of the plurality of terminals; and
    means for creating an environment which will tolerate faults occurring within processes being implemented with said transactional environment, said means for creating provides a primary process for implementing user requests and a backup process, capable of implementing said user requests, which continues processing if a failure by said primary process occurs.

10. A system according to claim 9 wherein said means for recovery comprises means for automatically reinvocating all requests from said users, based on the satisfaction of specific predetermined criteria.

11. A system according to claim 10 wherein said means for recovery further comprises means for maintaining any output operations performed as a result of requests from said users of said plurality of terminals such that said output operations are recoverable and are restorable in any transaction, if a failure of the transactional environment occurs.

12. A system according to claim 9 wherein said primary process and said backup process are maintained in an active state and are synchronized with respect to each other.

13. A system according to claim 9 wherein said backup process is created only after a failure within said primary process, thereby relieving said terminal monitor from maintaining both of said primary and backup process and synchronization therebetween.

14. A method for supporting a system which provides a transactional environment, including a transaction manager, wherein a group of operations being executed by data resources are organized as a transaction, said method comprising the steps of:
providing direct access of data between said transaction manager and said data resources;
supervising at least one of said data resources;
determining a result of said operations by determining whether said operations are successful or unsuccessful; and
determining a result of said transaction by determining whether said transaction is successful or unsuccessful;
aborting any transaction including an unsuccessful operation therein; and
committing data to a transaction requestor for all transactions including only successful operations.

15. A method according to claim 14 wherein said step of supervising comprises the steps of:
communicating with each of said data resources participating in a specific said transaction; and
maintaining a log which lists said participating data resources and the results of said operations performed by said participating data resources.

16. A method according to claim 14 wherein said step of supervising further comprises the step of controlling access to said data resources by excluding access to said data resources and detecting any condition imposed, by at least two of said data resources upon one another, where access to said data resources is mutually excluded.

17. A method according to claim 14 wherein said step of supervising further comprises the step of recovering the results of all of said transactions, if a system failure occurs, said step of recovering including:
undoing all of said unsuccessful transactions; and
redoing all of said successful transactions.

18. A method of terminal monitoring which provides terminal support in a transactional environment, including a basic operating system, where a plurality of terminals are present, said method of terminal monitoring comprising the steps of:
implementing one of a plurality of methods to support said plurality of terminals; and
providing specific services which allow said plurality of terminals to implement a plurality of transactions, said services including at least one function to coordinate said plurality of terminals.

19. A method according to claim 18 wherein said step of implementing comprises the steps of:
reducing resources required to service a terminal initiating operation for each of said plurality of terminals; and
monitoring each of said plurality of terminals.

20. A method according to claim 18 wherein said step of implementing further comprises the step of simultaneously servicing said plurality of terminals within a single process by utilizing said base operating system.

21. A method according to claim 20 wherein said step of simultaneous servicing further comprises the step of utilizing a pause associated with user dialog at a first terminal to service remaining ones of said plurality of terminals.

22. A method according to claim 18 wherein said step of providing specific services further comprises the steps of:
validating requests by users of said plurality of terminals, and verifying any privileges of use afforded said users within said transactional environment;
prioritizing execution of one of said plurality of transactions based upon predetermined criteria;
recovering said requests from said users of the plurality of terminals; and
creating an environment which will tolerate faults occurring within processes being implemented within said transactional environment, said step of creating providing a primary process for implementing user requests and a backup process, each capable of implementing said user requests, said backup process continues processing, if a failure by said primary process occurs.

23. A method according to claim 22 wherein said step of recovering further comprises the step of automatically reinvocating all requests from said users, based on the satisfaction of specific predetermined criteria.

24. A method according to claim 23 wherein said step of recovering further comprises the step of maintaining any output operations performed as a result of requests from said users of said plurality of terminals such that said output operations are recoverable and are restorable in any transaction, if a failure of the transactional environment occurs.

25. A method according to claim 24 wherein said step of creating further comprises the step of maintaining said primary process and said backup process in an active state and synchronized with respect to each other.

26. A method according to claim 22 wherein said step of creating further comprises the step of generating said backup process only after a failure within said primary process, thereby relieving said method of terminal monitoring from maintaining both of said primary and backup processes and synchronization therebetween.

27. A transaction manager which provides a transactional environment wherein a group of operations, being executed by data resources, are organized as a transaction, said transaction manager comprising:
means for providing direct access of data between said transaction manager and said data resources;
means for supervising at least one of said data resources, including:
coordination means for communicating with each of said data resources participating in a specific said transaction, and for maintaining a log which lists said participating data resources and the results of said operations performed by said participating data resources;
concurrency means for controlling access to said data resources by excluding access to said data resources and detecting any condition, imposed by at least two of said data resources upon one another, where access to said data resources is mutually excluded; and
recovery means for recovering the results of all of said transactions, if a system failure occurs;
operation outcome means for determining a result of said operations by determining whether said operations are successful or unsuccessful; and
transaction outcome means for determining a result of said transaction by determining whether said transaction is successful or unsuccessful, and operating to abort any transaction including an unsuccessful operation and committing data to a transaction requestor for all transactions including only successful operations.

28. A method for supporting a system which provides a transactional environment, including a transaction manager, wherein a group of operations being executed by data resources are organized as a transaction, said method comprising the steps of:
providing direct access of data between said transaction manager and said data resources;
supervising at least one of said data resources, including the steps of:
communicating with said data resources participating in a specific said transaction;
maintaining a log which lists said participating data resources and a result of said operations performed by said participating data resources;
controlling access to said data resources by excluding access to said data resource and detecting any condition imposed, by at least two of said data resources upon one another, where access to said data resources is mutually excluded; and
recovering the results of all of said transactions, if a system failure occurs;
determining a result of said operations by determining whether said operations are successful or unsuccessful; and
determining a result of said transaction by determining whether said transaction is successful or unsuccessful, including aborting any transaction including an unsuccessful operation and committing data to a transaction requestor for all transactions including only successful operations.

29. A computer program product, to be implemented in conjunction with a data processing system, wherein a group of operations, being executed by data resources, are organized as a transaction including a transaction manager, said product comprising:
means for providing direct access of data between said transaction manager and said data resources;
means for supervising at least one of said data resources;
operation outcome means for determining a result of said operations by determining whether said operations are successful or unsuccessful; and
transaction outcome means for determining a result of said transaction by determining whether said transaction is successful or unsuccessful and operating to abort any transaction including an unsuccessful operation and committing data to a transaction requestor for all transactions including only successful transactions.

30. A computer program product according to claim 19 wherein said means for supervising comprises coordination means for communicating with each of said data resources participating in a specific said transaction, and for maintaining a log which lists said participating data resources and the results of said operations performed by said participating data resources.

31. A computer program product according to claim 19 wherein said means for supervising further comprises concurrency means for controlling access to said data resources by excluding access to said data resources and detecting any condition, imposed by at least two of said data resources upon one another, where access to said data resources is mutually excluded.

32. A computer program product according to claim 29 wherein said means for supervising further comprises means for recovering the results of all of said transactions, if a system failure occurs, by undoing all of said unsuccessful transactions, and redoing all of said successful transactions.

33. A computer program product, to be implemented in conjunction with a data processing system, for implementing terminal monitoring which provides terminal support in a transactional environment where a plurality of terminals are present, said product comprising:
terminal loading support means for implementing one of a plurality of methods to support said plurality of terminals; and
transaction scheduling means for providing specific services which allow said plurality of terminals to implement a plurality of transactions, said services including at least one function to coordinate said plurality of terminals.

34. A computer program product according to claim 33 wherein said terminal loading support means comprises:
means for reducing resources required to service terminal initiation operations for said plurality of terminals; and
means for monitoring all of said plurality of terminals.

35. A computer program product according to claim 33 wherein said terminal loading support means comprises means for simultaneously servicing said plurality of terminals within a single process by utilizing an associated base operating system.

36. A computer program product according the claim 35 wherein said simultaneous servicing means comprises means for utilizing a pause associated with user dialog at a first terminal to service remaining ones of said plurality of terminals.

37. A computer program product according to claim 33 wherein said transaction scheduling means comprises:
means for validating requests by users of said plurality of terminals, and for verifying any privileges of use afforded said users within said transactional environment;
means for prioritizing the execution of one of said plurality of transactions based upon predetermined criteria;
means for recovering said requests from said users of the plurality of terminals; and
means for creating an environment which will tolerate faults occurring within processes being implemented within said transactional environment, said means for creating provides a primary process for implementing user requests and a backup process, capable of implementing said user requests, which continues processing if a failure by said primary process occurs.

38. A computer program product according to claim 37 wherein said means for recovery comprises means for automatically reinvocating all requests from said users, based on the satisfaction of specific predetermined criteria.

39. A computer program product according to claim 38 wherein said means for recovery further comprises means for maintaining any output operations performed as a result of requests from said users of said plurality of terminals such that said output operations are recoverable and are restorable in any transaction, if a failure of the transactional environment occurs.

40. A computer program product according to claim 37 wherein said primary process and said backup process are maintained in an active state and are synchronized with respect to each other.

41. A computer program product according to claim 37 wherein said backup process is created only after a failure within said primary process, thereby relieving said terminal monitor from maintaining both of said primary and backup process and synchronization therebetween.

* * * * *

UNITED STATES PATENT AND TRADEMARK OFFICE
CERTIFICATE OF CORRECTION

PATENT NO. : 5,095,421
DATED : March 10, 1992
INVENTOR(S) : Thomas J. Freund

It is certified that error appears in the above-identified patent and that said Letters Patent is hereby corrected as shown below:

Col. 13, line 40, please delete "manage" and insert --manager--;

Col. 17, line 21, please delete "resource" and insert --resources--;

line 56, please delete "19" and insert --29--; and       line 63, please delete "19" and insert --29--.

Signed and Sealed this

Twenty-first Day of September, 1993

Attest:

BRUCE LEHMAN

*Attesting Officer*      *Commissioner of Patents and Trademarks*